(12) United States Patent
Stark et al.

(10) Patent No.: US 6,688,124 B1
(45) Date of Patent: Feb. 10, 2004

(54) ELECTRONIC EXPANSION VALVE CONTROL FOR A REFRIGERANT COOLED VARIABLE FREQUENCY DRIVE (VFD)

(75) Inventors: Michael Stark, Charlotte, NC (US); Cornelius Holmes, North Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/289,748

(22) Filed: Nov. 7, 2002

(51) Int. Cl.[7] ............................ F25B 41/04; F25D 23/12
(52) U.S. Cl. ........................ 62/222; 62/228.4; 62/259.2
(58) Field of Search ................ 62/259.2, 222, 62/230, 228.4, 199, 200

(56) References Cited

U.S. PATENT DOCUMENTS

| | | | | |
|---|---|---|---|---|
| 3,388,559 A | * | 6/1968 | Johnson | 62/224 |
| 3,407,623 A | * | 10/1968 | Richardson et al. | 62/197 |
| 4,720,981 A | * | 1/1988 | Helt et al. | 62/113 |
| 5,220,809 A | * | 6/1993 | Voss | 62/259.2 |
| 6,116,040 A | | 9/2000 | Stark | |
| 6,237,353 B1 | | 5/2001 | Sishtla et al. | |
| 6,434,960 B1 | * | 8/2002 | Rousseau | 62/228.4 |
| 6,523,361 B2 | * | 2/2003 | Higashiyama | 62/228.4 |
| 2003/0041607 A1 | * | 3/2003 | Baumert et al. | 62/199 |

* cited by examiner

Primary Examiner—Marc Norman
(74) Attorney, Agent, or Firm—Wall Marjama & Bilinski LLP

(57) ABSTRACT

A control system for a refrigerant cooled variable frequency drive (VFD) for a chiller includes a controller which controls an electronic expansion valve to attempt to maintain a heat sink for the variable frequency drive within its design operating range. When the controller is unable to maintain the heat sink within its design operating range, a load on the chiller is reduced, either by reducing the frequency of the variable frequency drive, or if the chiller includes a compressor with internal guide vanes, by partially closing the guide vanes. The power rating of the VFD can thus be optimized based on its heat generating components operating at a controlled condition, unlike an air-cooled device which is dependent on the ambient environment.

4 Claims, 3 Drawing Sheets

ELECTRONIC EXPANSION VALVE CONTROL FOR A REFRIGERANT COOLED VARIABLE FREQUENCY DRIVE (VFD)

FIELD OF THE INVENTION

This invention relates generally to the field of refrigerant cooled variable frequency (VFD) drives associated with a refrigerant compressor, and more particularly to a method and system which enhances the transmitted power of the VFD at optimal operating conditions, while restricting the transmitted power when conditions are not ideal for cooling.

BACKGROUND OF THE INVENTION

Compressors used in many refrigeration systems generally require close control over the compressor motor speed in order to maintain the system within desired limits under varying load conditions. The compressors are therefore equipped with variable frequency drives (VFD) that contain power electronic components that can overheat and thereafter require cooling. Cooling is generally provided to the power electronics by mounting the electronics on a heat sink and removing the heat from the sink by circulating coolant in or around the heat sink. The capability of the heat sink and cooling system are of primary consideration in determining the power capacity of the VFD.

VFD's that are used today are designed and rated for the worst case ambient operating conditions. By measuring the temperature of the VFD electronics base plate, a control device can make a decision as to the power handing capability of the drive. Thus, below a certain nominal VFD heat sink temperature, the drive is rated to operate at a specified temperature. When the temperature of the heat sink goes above the nominal operating temperature, the drive power handling rating is reduced, thus limiting the cooling capacity of the chiller. This operating condition is typically an off-design condition where the chiller is not rated for a particular capacity.

U.S. Pat. No. 6,116,040 describes a refrigerant system in which the VFD electronic components are mounted on a heat sink such that refrigerant from the system condenser is passed through the heat sink by a flow line and returned to the low pressure side of the system. A control valve is mounted in the flow line which throttles refrigerant passing through the line to produce cooling of the heat sink to maintain the temperature of the electronic components within a desired range. A temperature sensor on the heat sink provides temperature information to the control valve.

SUMMARY OF THE INVENTION

Briefly stated, a control system for a refrigerant cooled variable frequency drive (VFD) for a chiller includes a controller which controls an electronic expansion valve to attempt to maintain a heat sink for the variable frequency drive within its design operating range. When the controller is unable to maintain the heat sink within its design operating range, a load on the chiller is reduced, either by reducing the frequency of the variable frequency drive, or if the chiller includes a compressor with internal guide vanes, by partially closing the guide vanes. The power rating of the VFD can thus be optimized based on its heat generating components operating at a controlled condition, unlike an air-cooled device which is dependent on the ambient environment.

According to an embodiment of the invention, a control system for a refrigerant cooled variable frequency drive for a chiller includes first control means for controlling an electronic expansion valve to attempt to maintain a heat sink for the variable frequency drive within its design operating range; and load reduction means for reducing a load on the chiller when the first control means is unable to maintain the heat sink within its design operating range.

According to an embodiment of the invention, a method for controlling a refrigerant cooled variable frequency drive for a chiller includes the steps of controlling an electronic expansion valve to attempt to maintain a heat sink for the variable frequency drive within its design operating range; and reducing a load on the chiller when the step of controlling is unable to maintain the heat sink within its design operating range.

DETAILED DESCRIPTION OF THE PREFERRED EMBODIMENT

Figure 1:
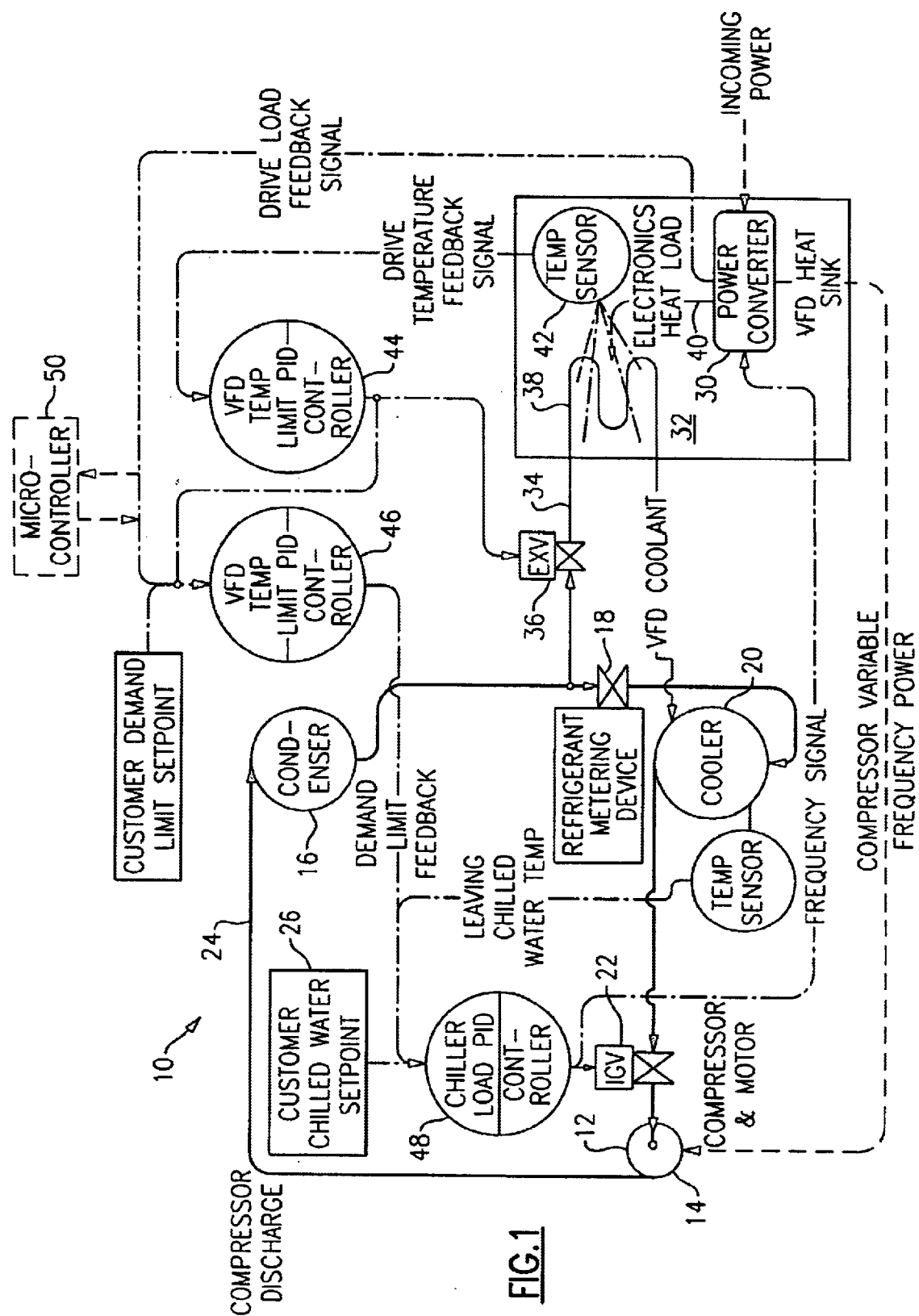
FIG. 1 shows a schematic diagram of a chiller incorporating an embodiment of the invention.

Referring to FIG. 1, a schematic diagram of a chiller 10 is shown. Examples of chillers that could be configured with an embodiment of the invention are the Carrier Model 19XRV centrifugal chiller and Carrier Model 23XR screw chiller. Chiller 10 includes a refrigeration cycle having a compressor 12, with a motor 14, and a condenser 16 connected to the discharge side of compressor 12. A refrigerant metering device 18 is connected between condenser 16 and a cooler 20. Refrigerant metering device 18 expands the high pressure refrigerant leaving condenser 16 to a lower temperature and pressure.

Compressor 12 preferably includes internal guide vanes (IGV) shown schematically at 22. The refrigerant path between the refrigerant system components is shown by 24. Motor 14 is equipped with a variable frequency drive (VFD) 30 that controls the motor speed. The VFD power electronics are preferably mounted directly on a heat sink 32. VFD 30 is preferably cooled via a separate refrigerant line 34 with an electronic expansion valve (EXV) 36 or flow control valve that throttles down the refrigerant from the high pressure side of condenser 16 to a lower pressure and temperature to provide cooling to an internal flow channel 38 in heat sink 32. The electronics heat load is whisked away to channel 38 as shown by an arrow 40.

With refrigerant cooling of VFD 30, the drive operating conditions are independent of the ambient condition of VFD 30. Knowing that the design rating of the drive will not be at the worst case ambient condition, the utilization of the drive electronics can be increased, thus increasing the power handling capability of a particular VFD frame or cost per unit cooling capacity.

At least one temperature sensor 42 is located on heat sink 32 of VFD 30 in such a place to reference the temperature of the power components of VFD 30. The temperature values are then read by a first VFD temperature limit PID (proportional-integral-derivative) controller 44. Controller 44 preferably performs two functions. First, it controls the position of the EXV 36 to maintain VFD heat sink 32 within its design operating range. Second, it passes the average base plate temperature of heat sink 32 to a second VFD temperature limit PID controller 46. A customer demand limit setpoint 52 also provides input to PID controller 46. The objective of the chiller system is for the chiller to keep up with the cooling load, as requested by the customer, put on the chiller.

When the VFD cooling system can no longer maintain the design temperature for heat sink 32, logic in controller 46 signals a chiller load PID controller 48. Chiller load PID controller normally is governed by a customer chilled water setpoint 26. The capacity of chiller 10 is only limited or reduced if the power rating of VFD 30, based on the temperature of heat sink 32, is exceeded by the operating power of chiller 10. The capacity of chiller 10 is then reduced by changing the control set point of chiller load PID controller 48, which results in either the compressor internal guide vanes (IGV) 22 closing or the frequency of VFD 30 being reduced. Controllers 44, 46, and 48 are preferably implemented in software, hardware, or firmware within a microcontroller 50.

Figure 2:
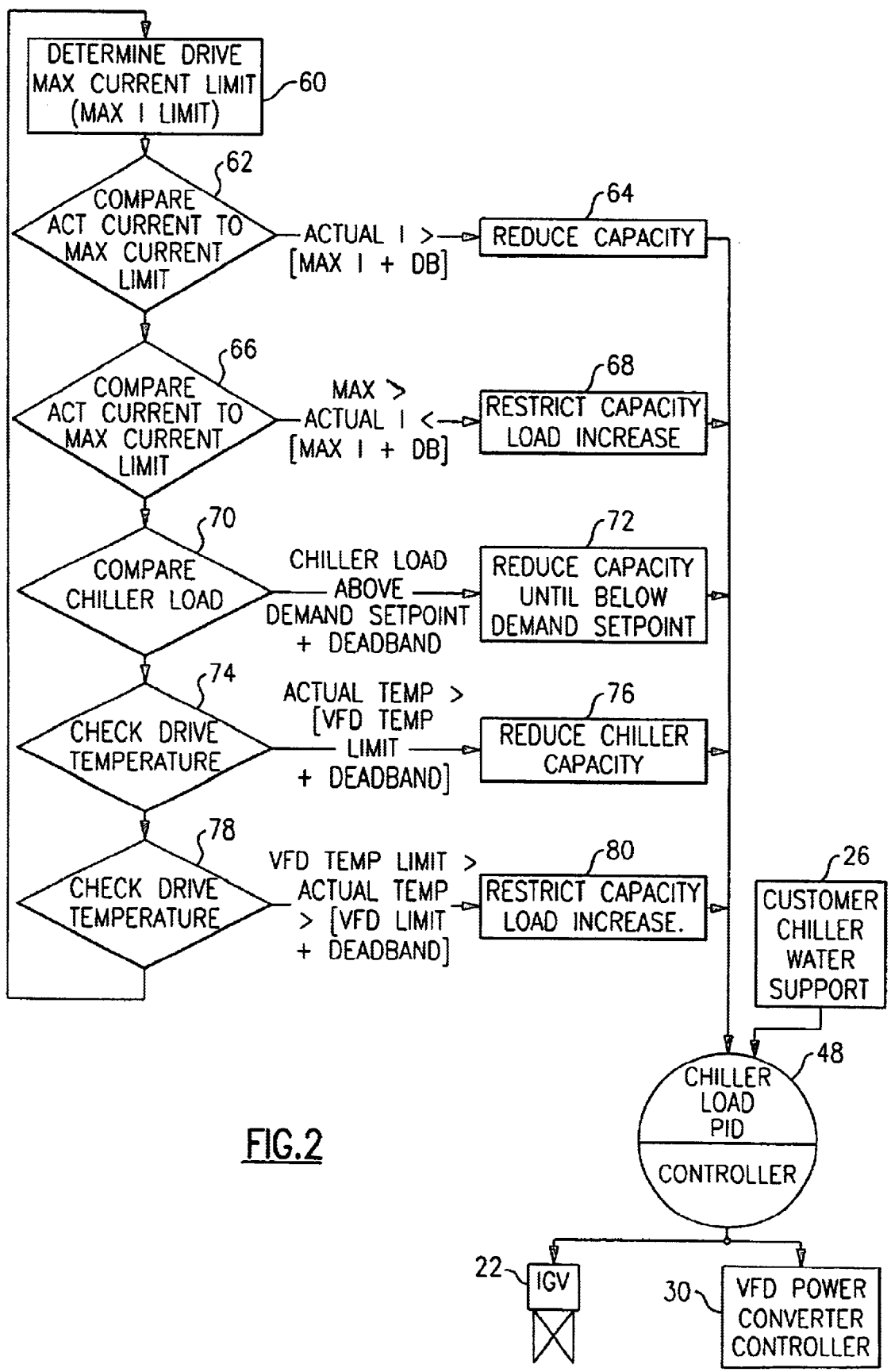
FIG. 2 shows a flow chart depicting an embodiment of the invention.
Figure 3:
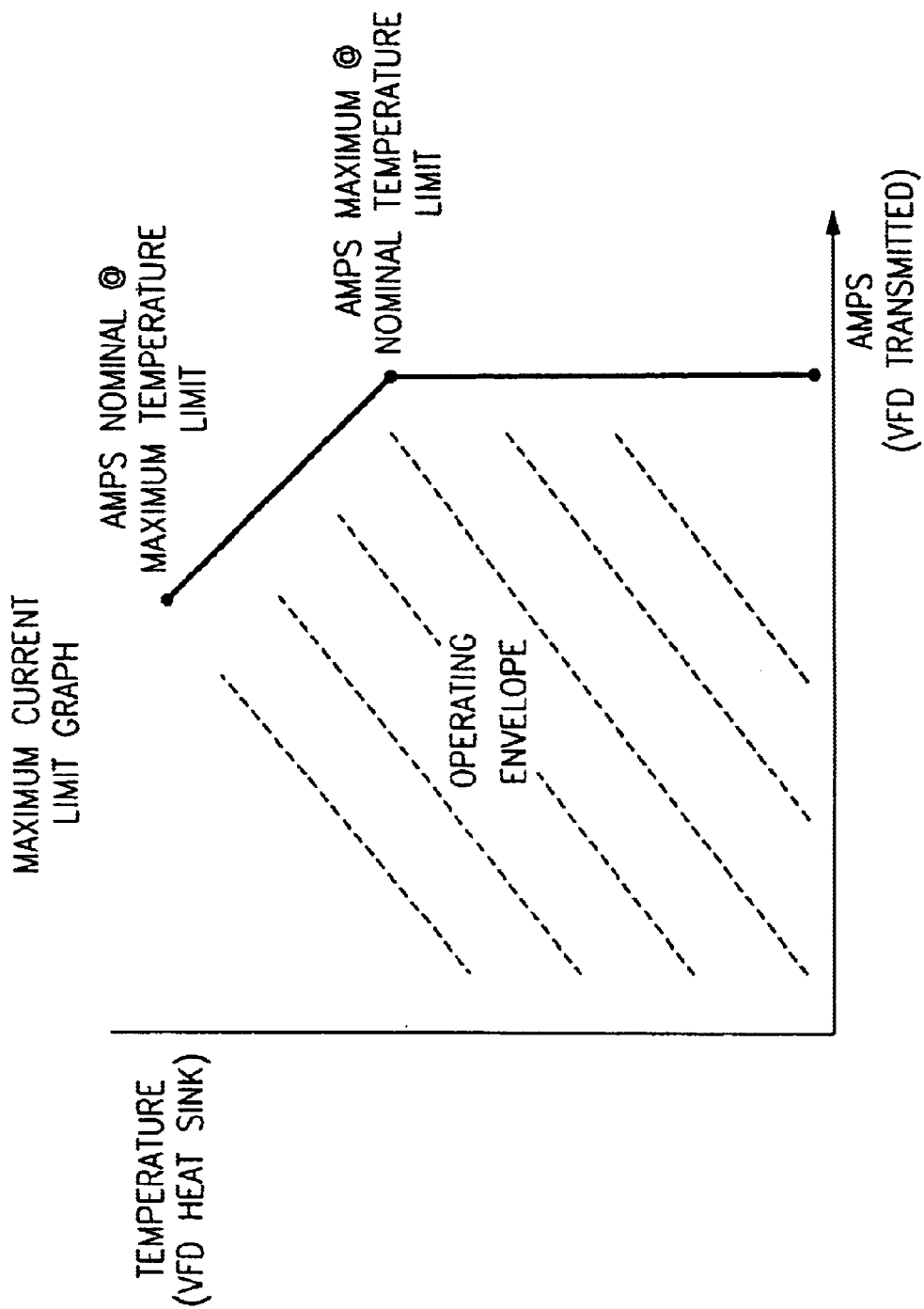
FIG. 3 shows a maximum current limit graph used with an embodiment of the invention.

Referring to FIG. 2, a flow chart of the control logic in microcontroller 50 is shown. The VFD maximum current limit is determined in step 60 from the maximum current limit graph in FIG. 3. The actual operating current is measured by current transducers and communicated to microcontroller 50. The VFD operating current is compared to the maximum current limit in step 62, and if the operating current exceeds the maximum limit current plus the deadband (DB), capacity is reduced in step 64 by a signal to chiller load PID controller 48 to reduce capacity. In step 66, the system again compares the actual operating current to the maximum current limit, and if the actual current is less than the maximum current limit but greater than the maximum current limit plus the deadband, then the capacity load increase is restricted in step 68. The chiller load is checked in step 70 to see if it is above the demand setpoint plus the deadband, and if so, capacity is reduced in step 72 until the chiller load is below the demand setpoint. Then the system checks in step 74 to see if the drive temperature is above the VFD temperature limit plus the deadband, and if so, the system in step 76 signals chiller load PID controller 48 to restrict the capacity load increase. Then the system checks in step 78 to see if the drive temperature is less than the VFD temperature limit but greater than the VFD temperature limit plus the deadband, and if so, the system in step 80 signals chiller load PID controller 48 to restrict the capacity load increase.

Thus, when VFD temperature limit PHD controller 44 can't properly control the system by using EXV 36 to maintain VFD heat sink 32 within its design operating range, a signal passes to VFD temperature limit PID controller 46 which signals chiller load PID controller 48 to close the guide vanes 22 or reduce the VFD frequency to reduce the load on chiller 10. The invention permits rating the VFD power electronics to a higher utilization because it is controlled within its limits by controllers 42, 44. The invention also permits VFD 30 to be rated at the nominal condition instead of the extreme condition. That is, the rating for VFD 30 can be optimized around the drive instead of around the extreme condition.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A control system for a refrigerant cooled variable frequency drive for a chiller, comprising:

first control means for controlling an electronic expansion valve to attempt to maintain a heat sink for said variable frequency drive within its design operating range said control means including means for sensing the temperature of said heat sink;

load reduction means for reducing a load on said chiller when said first control means is unable to maintain said heat sink within its design operating range; and wherein said chiller includes a compressor having a plurality of internal guide vanes, and wherein said load reduction means includes means for at least partially closing said plurality of internal guide vanes when said first control means in unable to maintain said heat sink within its design operating range.

2. A control system according to claim 1, wherein said load reduction means includes second control means for controlling said variable frequency drive to reduce said frequency of said variable frequency drive when said first control means in unable to maintain said heat sink within its design operating range.

3. A method for controlling a refrigerant cooled variable frequency drive for a chiller, comprising the steps of:

sensing the temperature of a heat sink for said variable frequency drive in response to said sensed temperature controlling an electronic expansion valve to attempt to maintain said temperature within a design operating range of said variable frequency drive;

reducing a load on said chiller when said step of controlling is unable to maintain said temperature within said design operating range; and further comprising the step of providing a compressor for said chiller having a plurality of internal guide vanes, and wherein said step of reducing said load includes at least partially closing said plurality of internal guide vanes when said step of controlling said electronic expansion valve is unable to maintain said heat sink within its design operating range.

4. A method according to claim 3 wherein said step of reducing a load includes controlling said variable frequency drive to reduce said frequency of said variable frequency drive when said step of controlling said electronic expansion valve is unable to maintain said heat sink within its design operating range.

\* \* \* \* \*